Figure 1:
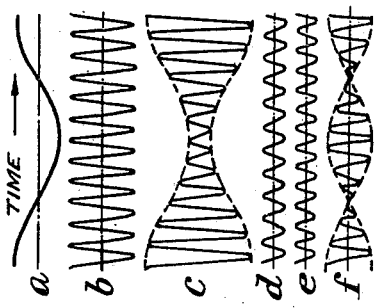

March 9, 1948. M. SKENE ET AL 2,437,275
SCANNING REFERENCE GENERATOR
Filed July 27, 1946 2 Sheets-Sheet 1

INVENTORS
MATTHEW SKENE
CHARLES H. GUILES
BY
Paul B. Hunty
ATTORNEY

March 9, 1948.  M. SKENE ET AL  2,437,275
SCANNING REFERENCE GENERATOR
Filed July 27, 1946  2 Sheets-Sheet 2

INVENTORS
MATTHEW SKENE
CHARLES H. GUILES
BY Paul B. Hunter
ATTORNEY

Patented Mar. 9, 1948

2,437,275

UNITED STATES PATENT OFFICE 2,437,275

SCANNING REFERENCE GENERATOR

Matthew Skene, Hempstead, and Charles H. Guiles, Garden City, N. Y., assignors to The Sperry Corporation, a corporation of Delaware Application July 27, 1946, Serial No. 686,710

22 Claims. (Cl. 177—351)

This invention relates to devices for scanning a beam of radiant energy and more particularly to the generating of reference voltages in synchronism with the said scanning.

In many applications, such as object-detecting, distance-measuring and radio-locating devices, it is desirable to scan a projected beam of radiant energy over a predetermined solid angle usually conical in form, in order that the presence and/or distance of a distant object located within the conical angle may be detected and measured by associated apparatus.

Such scanning devices are quite frequently adapted to scan a predetermined conical angle by means of spiral motion of the scanning member. This motion is provided by rapidly rotating or spinning the scanning member about one axis while slowly oscillating or nodding the member about a second axis perpendicular to, and rotating with the first axis.

In addition, to such a spiral scanning or searching operation, it is desirable occasionally to convert the spiral scanning which is generally effective over a wide solid angle, to a type of circular conical scanning, having a very narrow apex angle whereby the actual orientation of the target may be indicated more accurately for tracking purposes. Such a change from spiral to circular scan may be produced by interrupting the nodding motion and tilting the scanning member to a fixed angle about the nod axis, whereby as it spins, the scanner will describe a circular motion.

This invention is particularly directed towards improved means for providing a cathode ray tube sweep in synchronism with the scanning member. To produce a spiral sweep in a cathode ray tube in synchronism with the scanning member requires two voltages differing 90° in phase at spin frequency whose amplitudes are simultaneously modulated at the nod frequency. If the modulating frequency is a sub-multiple of the modulated frequency, a stationary spiral pattern will be traced on the cathode ray screen, if not, the pattern will rotate like a pinwheel. Devices of the prior art have generally utilized rotating potentiometers to produce this modulation or have utilized other means requiring troublesome components involving moving contacts such as brushes, slip rings and demodulation circuits.

This invention avoids these objections by providing the required reference voltages by means of a pair of permanent magnet two-phase generators. The required modulation of the spin frequency by the nod frequency is obtained by operating one generator at each side-band frequency, that is, spin plus nod and spin minus nod frequency and combining their outputs as will be more fully explained hereafter. This method has the advantage of doing away with all moving contacts and demodulation circuits, since the rotors of the generators are permanent magnets and require no excitation.

Accordingly, it is an object of the present invention to provide new and improved means of spirally sweeping a cathode ray beam in synchronism with a scanning member.

Another object is to provide means of sweeping the cathode ray beam in a spiral manner comprising a pair of permanent magnets, two-phase generators, one operating at spin plus nod frequency and the other at spin minus nod frequency.

Another object is to provide in a spirally scanning system, cathode ray scanning means adapted to scan in azimuth or elevation along one axis.

Another object is to provide a phase reference voltage synchronized with the angular orientation of the scanning member in the tracking mode of operation.

Another object is to provide cathode ray tube scanning means having no moving contacts such as brushes or slip rings.

Figure 5:
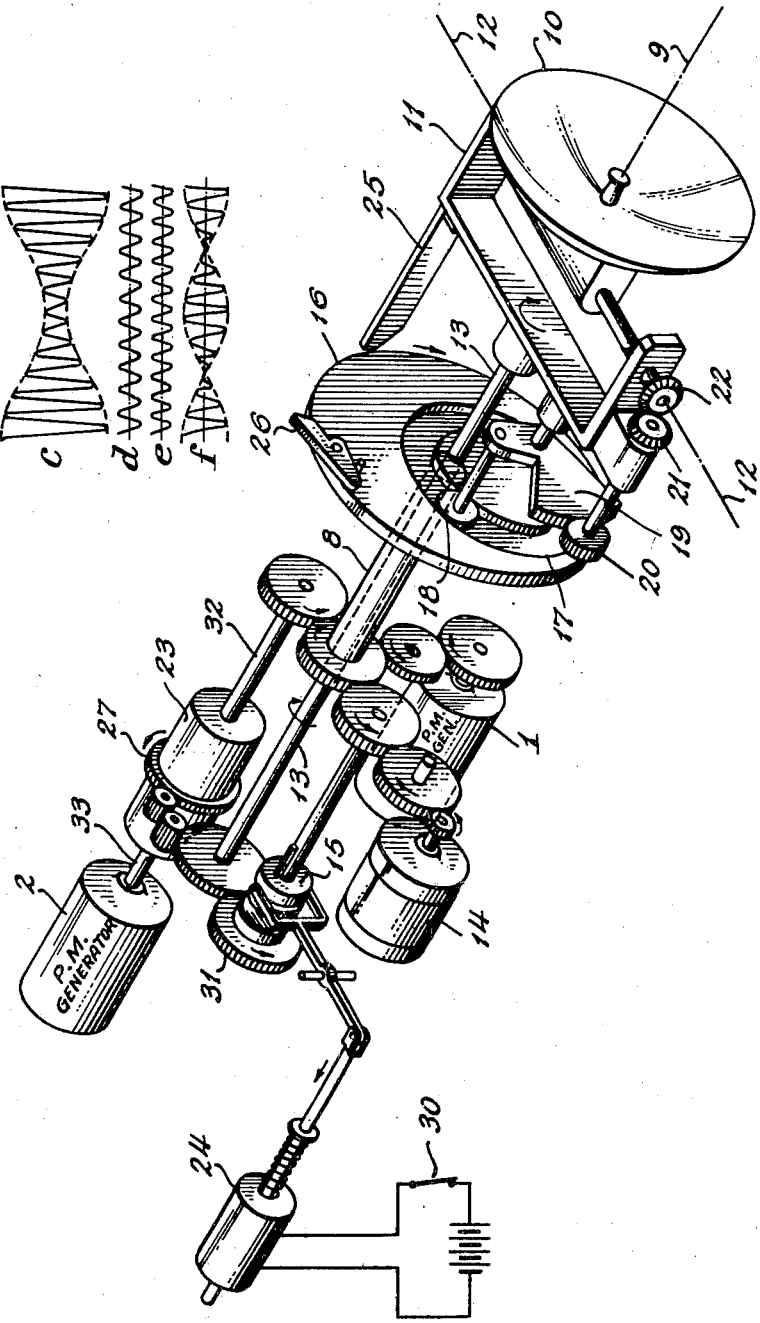
Figure 2:
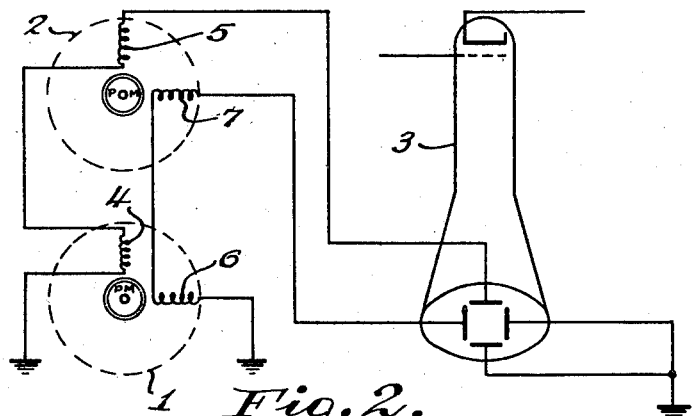
Figure 2A:
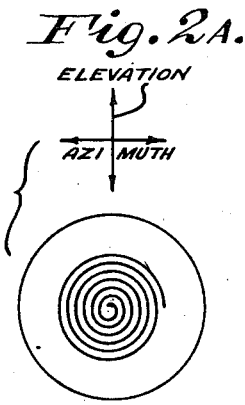
Figure 3:
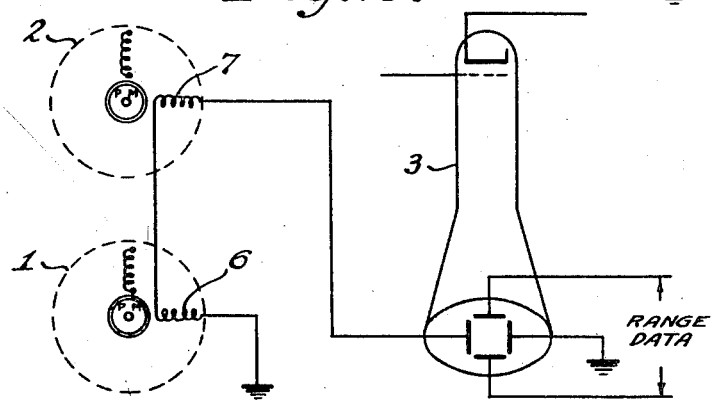
Figure 3A:
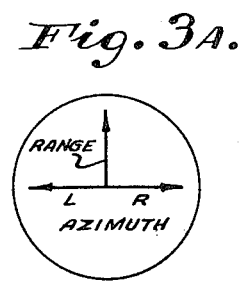
Figure 4:
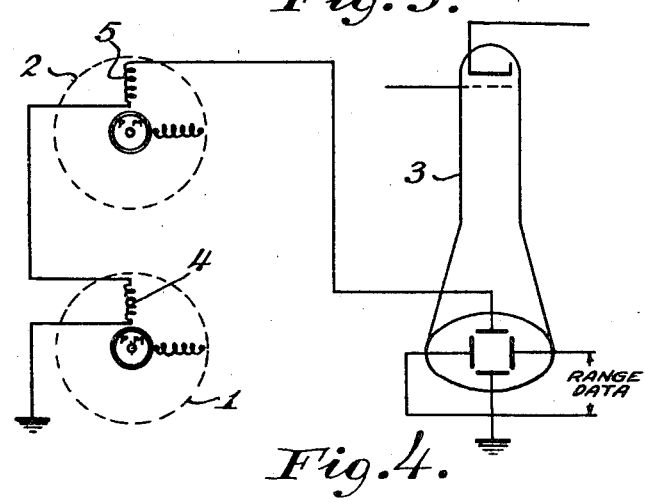
Figure 4A:
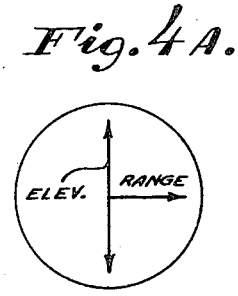

Other objects and advantages will be apparent from the following description taken in connection with the drawings, wherein, Fig. 1 shows wave forms illustrative of the principle of operation;

Figs. 2, 3 and 4 are schematic electrical diagrams of embodiments of the invention; and Fig. 5 is an exploded diagrammatic view of an embodiment of the invention.

The required modulation of the spin frequency by the nod frequency, as previously discussed may be explained with reference to Fig. 1, wherein wave form $a$ is a representation of a voltage at the nod frequency, and wave form $b$ is a representation of a voltage at the spin frequency. Wave form $c$ is a representation of the spin frequency voltage modulated by the nod frequency voltage. As is well-known, this modulated voltage $c$ contains in addition to the carrier or spin frequency and modulating frequency, two independent periodic waves called sidebands having frequencies equal to the spin minus nod frequency and the spin plus nod frequency as represented by wave forms $d$ and $e$. Wave form $f$ is equal to the sum of wave forms $d$ and $e$ and is known as a suppressed carrier modulation of the spin frequency by the nod frequency.

To produce the spiral scan requires two voltages differing 90° in phase at spin frequency simultaneously modulated by the nod frequency. Each of these voltages may be of the form of wave form *f* of Fig. 1 which is a combination referred to as a suppressed carrier modulation and which is the sum of the sideband frequencies as represented in wave forms *d* and *e*. To generate the desired voltages of the spin frequency modulated by the nod frequency as represented by wave form *f*, the invention generates the sideband frequencies as represented by *d* and *e* separately, by means of a pair of generators operating at each sideband frequency, and combines them electrically.

Referring to Fig. 2, the electrical connections of the generators are shown. The generators 1 and 2 used each have permanent magnet armatures and two stator windings displaced 90° from each other, one winding of generator 1 being connected in series with one winding of generator 2 and one set of deflecting plates of cathode ray tube 3. The other winding of generator 1 is connected in series with the other winding of generator 2 and the other set of deflecting plates of cathode ray tube 3.

Winding 4 of generator 1 generates a voltage similar to wave form *d* of Fig. 1, and it is connected in series with winding 5 of generator 2 which winding generates a voltage similar to wave form *e* of Fig. 1. These two outputs, in series, supply to the vertical deflecting plates of cathode ray tube 3, a voltage similar to wave form *f* of Fig. 1. Similarly, windings 6 and 7 supply a voltage similar to wave form *f* of Fig. 1 to the horizontal deflecting plates of cathode ray tube 3, this voltage being 90° displaced from the output voltage of windings 4 and 5.

Therefore, a voltage of spin frequency modulated by nod frequency is applied to each set of deflecting plates of cathode ray tube 3 and the voltages are 90° displaced in phase, thereby producing a spiral scan on the cathode ray tube screen, as shown in part A of Fig. 2.

In the tracking mode of operation, both generators are driven at the same frequency so they generate unmodulated voltages at the system frequency differing 90° in phase, which voltages are adaptable to produce a circular scan in the cathode ray tube. These voltage outputs of generators 1 and 2, in the tracking mode of operation, have definite phase relations to the instantaneous spin angles of the scanner 10, being connected by fixed gearing as will be shown in connection with Fig. 5, and these voltages may be used as reference voltages for automatic tracking purposes.

It is desirable in many instances to present an indication of data on a cathode ray tube having azimuth in degrees right or left along the horizontal axis and target range along the vertical axis, as shown in part A of Fig. 3.

Fig. 3 shows an adaptation of the system for generating the azimuth deflecting voltages for this type of presentation for a spirally scanning antenna. To do this, windings 6 and 7 of generators 1 and 2, respectively, are connected in series with the horizontal deflection plates of the cathode ray tube 3, thereby applying a voltage of the form of wave form *f* of Fig. 1 to the horizontal deflection plates, which voltage is proportional to an azimuth angle of the scanner 10 deflection at all times. The necessary range data may be applied to the vertical deflection plates, from associated apparatus.

Fig. 4 shows an adaptation of the system of the cathode ray tube presentation of elevation versus range as shown in part A of Fig. 4, which is a useful form of presentation in many cases. This form of presentation may be effected as shown in Fig. 4 by connecting windings 4 and 5 to generators 1 and 2, respectively, in series with vertical deflection plates of cathode ray tube 3. Suitable range data may be fed to the horizontal plates as shown from associated apparatus.

Thus, these three convenient search presentations may be effected by simple switching, or two or three systems of presentation may be used simultaneously in as many cathode ray tubes by parallel connections.

Referring to Fig. 5, there is shown an exploded diagrammatic view of the system components. This system has two modes of operation, the search mode and tracking mode. In the searching mode, there is imparted to the scanning member a spiral motion and in the tracking mode, a circular motion. This system is designed to be mounted in an orientable member such as a ball turret. When a target is discovered during the searching mode of operation, the turret is moved by manual control until the target is near the center of the cathode ray tube screen, that is, within the small tracking angle. Then the operation is shifted to the tracking mode which may be made fully automatic by associated apparatus responsive to the tracking reference voltages previously mentioned.

The generators 1 and 2, the electrical output of which has been previously discussed, are mechanically driven at spin plus nod, and spin minus nod frequencies in the searching mode of operation, and both at spin minus nod frequency in the tracking mode of operation, as will be more fully explained.

The mechanical changeover between the two modes of operation is accomplished by clutching means. The system, as first discussed, is connected for the searching mode of operation with the clutching means energized.

A scanning member 10 is pivotally mounted on a yoke 11 and adapted to oscillate or nod, about an axis 12. Yoke 11 is adapted to spin about an axis 9, being driven by rod member 13 which is coaxially disposed about axis 9 and which, in turn, is driven by motor 14 through clutch 15 and suitable gearing, clutch 15 being engaged, during the spiral, or searching, mode of operation.

The flat circular cam 16 is adapted to be rotated about said axis 9 in the same direction as, but at a lower frequency than the frequency of rotation of, the scanning member 10, being driven by motor 14 through suitable gearing and hollow rod member 8, which is coaxially disposed about axis 9 and rod 13. Said cam 16 contains a slot 17, which is designed to sinusoidally nod the scanning member 10 about axis 12 when the system is searching, by operation of cam follower 18, sector gear 19, gear 20 and bevel gears 21 and 22. The nod frequency is equal to the difference in spin frequencies between scanner 10 and cam 16.

Therefore, the scanner 10 simultaneously spins and nods, the resultant of the two motions being a spiral motion in which the nod angular variation is sinusoidal. The nod frequency, as previously mentioned, is equal to the slippage frequency between the spin frequencies of cam 16 and scanner 10.

The permanent magnet two-phase generator 1 is driven by motor 14 through suitable gearing at the same frequency of rotation as cam 16, that is, equal to the spin frequency of scanner 10 minus the nod frequency of scanner 10.

The second permanent magnet two-phase generator 2 is driven by mechanical differential 23. The two inputs to the mechanical differential 23 are spin frequency and spin minus nod frequency.

It is well known that the cage of a differential will rotate at the average of two rotations applied to its other two variable elements. In this case the cage 27 is driven at spin frequency, which is the average differential frequency, and one of the other two variable elements is driven at spin minus nod frequency. The cage 27 is driven at scanner spin frequency as it is connected to yoke 11 by means of rod 13 and suitable gearing. The other input member 32 of the mechanical differential is at the same frequency as generator 1, that is, spin minus nod frequency, being geared to cam 16 through rod 8.

Therefore, the output of the third variable member 33 is spin plus nod frequency, and this output drives the second permanent magnet generator 2.

Thus, in this embodiment, a mechanical differential is utilized to produce the spin plus nod frequency which is desired. However, the invention is not limited to the use of a mechanical differential as the second generator could also be driven at the desired speed by suitable gearing or other means.

As the yoke 11 is rotating faster than cam 16 during the searching mode of operation, the pawl stop 25 on yoke 11 overrides the pawl 26 periodically.

Heretofore we have been discussing the search mode of operation exclusively. We will now discuss the tracking mode of operation.

To change over from searching to tracking operation, the clutch 15 connection is broken by the action of solenoid 24 when it is deenergized by opening switch 30 thereby removing the driving force from the rod member 13 which is connected to yoke 11, and from the cage 27 of differential 23. Therefore, yoke 11 slows down until its speed becomes lower than that of cam 16, at which time pawl 26, which is constantly thrown out by centrifugal force but which is overridden periodically by the pawl stop 25 in the searching mode of operation, engages the pawl stop 25 and cam 16 drives the yoke 11, at the constant cam frequency.

The cage 27 of differential 23 is now also driven at this same cam frequency by yoke 11 through rod 13 and associated gearing, and gear 31 will now idle at this frequency. The other differential input is directly driven at cam frequency also, through rod 8.

Therefore, as both differential inputs are at cam frequency the differential output which drives generator 2 is also at cam frequency.

It is to be noted that in the tracking mode of operation, the entire system operates at the cam frequency which is equal to the spin minus nod frequency of the search mode of operation.

The angular position of the pawl 26 on the circumference of the cam 16 is such that in the tracking mode of operation the scanner 10 is tilted about axis 12, a fixed angle through the operation of sector gear 19 and gears 20, 21 and 22. Therefore, as it spins, the scanner 10 describes a circular motion of fixed radius referred to as conical scanning.

As previously mentioned, the voltage outputs of generators 1 and 2 have definite phase relationships with the instantaneous spin angles of the scanner during the tracking mode of operation and they may be used as phase reference voltages for automatic tracking purposes.

The scanning apparatus of this invention is adapted to be used with any conventional radar system comprising a transmitter and receiver both connected to the antenna shown in the invention. The output of the receiver of the radar system may be connected to the grid of the cathode ray tube of Fig. 2, thereby intensity modulating the electron beam when an echo signal is received by the receiver, and causing a spot to appear on the screen of the cathode ray tube at the instantaneous angular position corresponding to that of the scanning member and the detected object. The cathode ray beam is normally biased below cutoff so that no indications appear on the screen unless an echo signal is received. Other forms of presentation from a conventional radar system output are shown in Figs. 3 and 4.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for indicating the instantaneous angular position of a member, which member is adapted to rotate about a first axis and oscillate about a second axis perpendicular to and rotating with said first axis, comprising an indicator having an indicating beam, means for generating signals including frequencies greater and less than the frequency of said rotation by the frequency of said oscillation, and means for deflecting said beam in response to said signals.

2. Apparatus for indicating the instantaneous angular position of a member corresponding to the position of a detected object, which member is adapted to rotate about a first axis and oscillate about a second axis perpendicular to and rotating with said first axis, comprising an indicator having an indicating beam, means for generating signals including frequencies greater and less than the frequency of said rotation by the frequency of said oscillation, and means for deflecting said beam in response to the sum of said signals, and means for producing an indication of said detected object in its proper instantaneous angular relationship.

3. Apparatus for indicating the angular position of a member, which member is adapted to rotate about a first axis and oscillate about a second axis perpendicular to and rotating with said first axis, comprising an indicator having an indicating beam, means for generating a first pair of signals having frequencies greater and less than the frequency of said rotation by the frequency of said oscillation, means for providing a second pair of signals similar to said first pair in frequencies but phase displaced therefrom, means for deflecting said beam in one direction in response to said first pair of signals, and means for deflecting said beam in a second direction at an angle to said first direction dependent upon said phase displacement in response to said second pair of signals.

4. Apparatus for indicating an angular position of a member which member is adapted to rotate about a first axis and oscillate about a second axis perpendicular to and rotating with said first axis, comprising an indicator having an indicating beam, a pair of generators for supplying first and second signals at frequencies greater and less, respectively, than the frequency of said rotation by the frequency of said oscillation, means providing third and fourth signals similar to said first and second signals, respectively, but equally phase displaced therefrom, means for deflecting said beam in one direction in response to the sum of said first and second signals and means for deflecting said beam in a second direction at an angle to said first direction depending upon said phase displacement in response to the sum of said third and fourth signals.

5. Apparatus for sweeping an indicating beam in a spiral manner on a screen comprising a generator for supplying a first signal at one frequency, a generator for supplying a second signal at a different frequency, means providing a third and fourth signal similar in frequencies to said first and second signals, respectively, but equally phase displaced therefrom, means for deflecting said beam in one direction in response to the sum of said first and second signals, and means for deflecting said beam in a second direction at an angle to said first direction depending upon said phase displacement in response to the sum of said third and fourth signals.

6. Apparatus for sweeping an indicating beam on a screen in a spiral at the arithmetic average of a first and a second frequency, comprising a generator for supplying a first and a second signal in predetermined phase angle relationship at said first frequency, a generator for supplying a third and a fourth signal in said predetermined phase relationship at said second frequency, means for deflecting said beam along a first axis in accordance with the sum of said first and third signals, and means for deflecting said beam along another axis at an angle relative to said first axis corresponding to said phase angle, in accordance with the sum of said second and fourth signals.

7. Apparatus for producing spiral deflecting voltages of the suppressed carrier, modulated type in a cathode ray tube comprising at least two two-phase generating means, at least one adapted to generate each sideband frequency, of said suppressed carrier modulated wave.

8. Apparatus for producing spiral deflecting voltages in a cathode ray tube comprising a two-phase generator operating at the sum of two frequencies and a second two-phase generator operating at the difference of the same two frequencies.

9. Apparatus for producing spiral, straight line and circular deflecting voltages in a cathode ray tube comprising at least two two-phase generators, one adapated to operate at the sum and another at the difference of two frequencies, means to change the operating frequencies of the generators to the same frequency, and connecting means to apply the generator outputs to the cathode ray tube.

10. In a scanning apparatus, a scanner capable of nodding and spinning, means for simultaneously nodding and spinning said scanner, means for synchronously generating signals at spin plus nod frequency and spin minus nod frequency, and indicating means responsive to said signals to indicate the movement of the scanner in nod and spin.

11. In a scanning apparatus, a scanner capable of nodding and spinning; means for simultaneously nodding and spinning said scanner; means for synchronously generating signals at spin plus nod frequency and spin minus nod frequency, and indicating means responsive to said signals to indicate the movement of the scanner along a reference axis.

12. In a scanning apparatus, a scanner capable of nodding and spinning in one mode of operation and moving in a circular manner in a second mode of operation; means to simultaneously nod and spin said scanner in said first mode of operation, and to move it in said circular manner in the second mode of operation; means for simultaneously generating signals at spin plus nod, and spin minus nod frequencies to generate two signals, differing 90° in phase, of spin frequency modulated by nod frequency in the first mode of operation; means to generate signals at spin frequency and proportional to the instantaneous spin angle in the second mode of operation; and indicating means responsive to the said signals to indicate the movement of the scanner in both modes of operation.

13. A scanning system comprising a scanning member adapted to be moved in a spiral motion, indicating means comprising a cathode ray tube and a pair of two-phase generators to generate two signals, differing 90° in phase, of spin frequency modulated by nod frequency for spirally sweeping the cathode ray beam thereof in synchronism with said scanning member.

14. A scanning system comprising a scanning member adapted to be moved in a spiral motion composed of simultaneous spinning and nodding motions, indicating means comprising a cathode ray tube, and means for spirally scanning the cathode ray beam thereof in synchronism with the scanning member, comprising at least two two-phase generators, one generator operating at the sum of the spin and nod frequencies and another generator operating at the difference of the spin and nod frequencies.

15. A scanning system comprising a scanning member adapted to be moved in a combined spinning and nodding motion, indicating means comprising a cathode ray tube, and means for scanning the cathode ray beam thereof in synchronism with the movement of the scanning member along one reference axis, comprising a pair of two-phase generators, one generator operating at the sum of the spin and nod frequencies and one generator operating at the difference of the spin and nod frequencies.

16. A scanning system comprising a scanning member; rotating means adapted to rotate said member about a first axis at a certain frequency; oscillating means adapted to oscillate said member sinusoidally about an axis perpendicular to the said first axis at a different frequency than said first frequency; reference voltage generating means adapted to generate voltages proportional to the position of the scanning member with reference to the said axes, comprising means to generate two voltages differing 90° in phase at a frequency equal to the sum of the rotation and oscillation frequencies and means to generate two voltages differing 90° in phase at a frequency equal to the difference of the rotation and oscillation frequencies.

17. A scanning system comprising a scanning member; spinning means; nodding means; said scanning member being adapted to be moved in a spiral motion in response to said spinning and nodding means; indicating means comprising a cathode ray tube and means for spirally scanning the cathode ray beam thereof in synchronism with the scanning member comprising a pair of generators each having two windings displaced 90° and adapted to operate at the sum and difference, respectively, of the spin and nod frequencies, one winding of each generator being connected in series with one set of deflecting plates of the said cathode ray tube and the other winding of each generator being connected in series with the other set of deflecting plates on said cathode ray tube.

18. In a scanning device adapted to be used for scanning and tracking purposes, a scanning member adapted to be moved in a spiral motion, means for changing the motion of the scanning member to a circular motion and cathode ray tube indicating means adapted to scan in synchronism with said scanning member, comprising two permanent magnet generators, one adapted to operate at sum, and the other at the difference of two frequencies during the searching mode of operation, and both at the same frequency during the tracking mode of operation.

19. A scanning system adapted to be used for searching and tracking purposes comprising a scanning member; spinning means to spin said scanning member about a first axis at a first frequency during the searching mode of operation and at a second frequency during the tracking mode of operation; nodding means to nod said scanning member about a second axis perpendicular to said first axis during a searching mode of operation and adapted to tilt said scanning member at a constant angle about said second axis during the tracking mode of operation; reference voltage generating means to generate voltages indicative of the position of the scanning member relative to said axes, comprising a pair of two phase generators, one adapted to operate at the sum and the other at the difference of the spin and nod frequencies during the searching mode of operation, and both adapted to generate voltages proportional to the angular position of the scanning member about said first axis during the tracking mode of operation.

20. A scanning system to be used for scanning and tracking purposes comprising a scanning member, spinning means adapted to spin said scanning member, nodding means adapted to sinusoidally nod said scanning member, cathode ray tube indicating means adapted to scan a cathode ray beam in synchronism with the scanning member comprising a pair of two-phase generating means, one adapted to generate the sum and the other the difference of the spin and nod frequencies in the searching mode of operation, and both adapted to generate the scanning member frequency in the tracking mode of operation.

21. Apparatus for producing spirally deflecting voltages in cathode ray tubes adapted to be used with associated radar equipment for producing target indications comprising a two-phase generator adapted to operate at the sum of two frequencies and a second two-phase generator adapted to operate at the difference of the sum of the same two frequencies.

22. A scanning system adapted to be used for scanning and tracking purposes comprising a scanning member; spinning means adapted to spin said scanning member; nodding means adapted to nod said scanning member; indicating means adapted to scan a cathode ray beam in synchronism with said scanning member comprising a mechanical differential; and a pair of two-phase permanent magnet generators, one adapted to operate at the sum of the spin and nod frequencies in response to said mechanical differential, and one adapted to operate at the difference of the spin and nod frequencies, during the searching mode of operation, and both adapted to operate at spin frequency of the scanning member during the tracking mode of operation.

MATTHEW SKENE.
CHARLES H. GUILES.

REFERENCES CITED

The following references are of record in the file of this patent:

UNITED STATES PATENTS

| Number | Name | Date |
| --- | --- | --- |
| 2,406,858 | Shepherd | Sept. 3, 1946 |
| 2,419,219 | Johnstone | Apr. 22, 1947 |